Oct. 27, 1931.  J. C. WALKER  1,829,205
METHOD OF TREATING OIL-WATER EMULSIONS
Filed Nov. 4, 1926
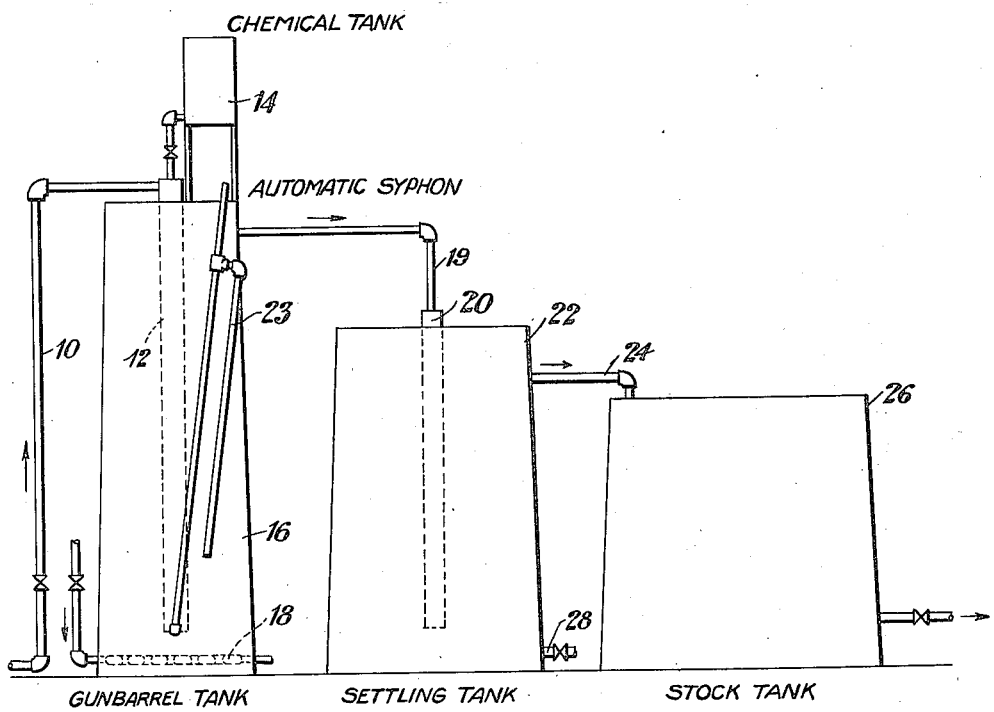

Patented Oct. 27, 1931

1,829,205

UNITED STATES PATENT OFFICE

JOHN C. WALKER, OF ELDORADO, KANSAS, ASSIGNOR TO EMPIRE OIL AND REFINING COMPANY, OF DOVER, DELAWARE, A CORPORATION OF DELAWARE

METHOD OF TREATING OIL-WATER EMULSIONS

Application filed November 4, 1926. Serial No. 146,177.

This invention relates to the breaking of oil-water emulsions and more particularly to a method of treating petroleum oil containing an emulsion of oil and water to break the emulsion and separate the water from the oil. The invention herein described was originally described in my application Ser. No. 519,843, filed Dec. 5, 1921, of which this forms a continuation in part.

The petroleum oil producing strata in many localities have water or brine in varying amounts associated with the oil. It has long been known that when crude oil and natural waters are pumped together from certain wells into tanks in the field and allowed to settle, only a portion of the water settles to the bottom of the tank as free water and between the bottom layer of free water thus formed and a layer of oil substantially free of water which is formed at the top of the tank there is found a layer of BS consisting essentially of an emulsion of the water-in-oil type. This layer of BS is not miscible in water but is readily miscible with and dispersed in oil, showing that the oil is in the continuous and the water in the dispersed phase or, in other words, that the emulsion is of the water-in-oil type. It is believed that these BS emulsions are formed largely as a result of the agitation of the oil and brine in the bottom of the well caused by the pumps, particularly defectively operating pumps, used in bringing the oil to the surface. The quantities of the emulsion so formed are great enough to constitute a serious problem to the oil industry. The emulsions are generally quite stable and therefore difficult to handle, and moreover they interfere seriously with the distillation of the crude oil so that it becomes necessary to substantially remove the emulsion from the oil before it is distilled. Various methods have been proposed for treating these emulsions for the purpose of breaking them down and separately collecting the water and oil constituents.

The primary object of the present invention is to provide an improved method for resolving emulsions of the water-in-oil type into their several constituents.

Examination of a concentrated BS emulsion will disclose globules of water surrounded by films, apparently of oil, which globules vary in size from those easily visible to the naked eye to sizes which are scarcely discernible in the compound microscope. In general, the BS emulsions formed by the agitation of petroleum oils and natural waters are quite stable and though there is concentration or "creaming out" of water globules, these globules do not coalesce. It is unlikely that this would be true if the globules of water were merely separated by a layer of oil of low interfacial tension, since upon "creaming out" and consequent contact there would be nothing to interrupt coalescence. It is evident, therefore, that a film with some rigidity protects the water globule. Such a film might be supplied by certain colloids such as a calcium or magnesium soap through adsorption at the interface.

The above consideration leads naturally to the assumption that a powerful colloid is present either in the water or in the oil. Since the emulsion is of the water-in-oil type the natural inference would be that the protective colloid appears in the oil. A large number of experiments have been carried out, the results of which indicate very strongly that it is the asphaltic and resinous bodies present in certain types of crude oil which are chiefly responsible for the formation of the stable and permanent BS emulsions of the water-in-oil type on agitation of the oil-water mixture. It has been further found that the asphaltic material present in crude oil yielding BS emulsions is very strongly interfacial and that this asphaltic material may be almost completely removed from oil by adsorption at the oil-water interface. This powerful interfacial adsorption property is an excellent proof of the efficiency of the resinous and asphaltic materials as emulsifying agents. Further experiments have demonstrated, however, that while the protective colloids present in the oil (asphaltic and resinous bodies, colloidal clay, iron sulphide and the like) are powerful emulsifying and also in some instances stabilizing agents, they cannot produce peptization and consequent emulsion formation unless the water is first dispersed in small globules by mechanical agitation. Therefore, careful handling of the oil-water mixture at the well will greatly decrease the emulsion formation.

Another object of the present invention is to provide a method by which water-in-oil emulsions may be effectively broken irrespective of the nature of the oils and brine of which the emulsions are formed.

With these and other objects in view the invention consists of the improved method of treating wet oils hereinafter described and particularly defined in the claims.

To dehydrate oil in accordance with the present invention, a reagent comprising either a water solution or a colloidal solution or suspension of one or more of the class of compounds hereinafter mentioned is thoroughly mixed with the wet petroleum oil, preferably by adding it to the wet oil in the pipe lines or field tanks located adjacent to the well. The mixture is then allowed to stratify in a settling tank and the water set free is removed from the oil. Dehydration may be carried out at prevailing atmospheric temperatures but it is sometimes preferred to heat the wet oil to a temperature of from 90° to 130° F. while it is being mixed with the reagent in the mixing vessel for the reason that in general heat increases the effectiveness of the treating agent, decreases the viscosity of the oil, aids in lowering the surface tension of the water and decreases the time required for stratification.

The substances for treating mixtures of oil and water to break emulsions of the water-in-oil type according to the present invention comprise mixtures of two or more products such as are formed for example when an organic compound of high molecular weight is modified by sulphonation, and such modified compound or its salts or esters is admixed with one or more other compounds having a lowering effect on the surface tension of water. This latter group of compounds is exemplified particularly by emulsifying agents of the hydrophile colloid type, i. e., those agents which are effective in promoting the formation of emulsions of the oil-in-water type. The preferred reagent employed in accordance with the present invention consists of the salt or similar reaction product of a sulpho-fatty acid, specifically sulpho-stearic acid and an ammonium licorice solution. This mixture, hereinafter designated as an ammonium licorice sulpho-stearic acid, appears to be an alkaline reacting salt of sulpho-stearic acid and may form a water solution of a colloidal nature.

To prepare the ammonium licorice sulpho-stearic acid mixture, sulpho-stearic acid is first formed by mixing commercial oleic acid with an excess of concentrated sulfuric acid at about 80° F. or lower and then removing the excess of sulfuric acid by washing with water and neutralizing the sulpho-stearic acid with a concentrated aqueous ammonium solution in which licorice has been dissolved. The aqueous ammonium solution is preferably one of specific gravity 0.90 in which one part of licorice is dissolved in twenty parts of the aqueous ammonia solution. As an alternative method of preparing the ammonium licorice solution, an aqueous extract of licorice may be used in which dry ammonia gas has been absorbed to the proper concentration (near saturation). In place of the ammonium licorice solution it has been found that effective reagents can be prepared by omitting the licorice and simply neutralizing the sulpho-stearic acid with the ammonium hydroxide to form the corresponding ammonium salt of sulpho-stearic acid. Both of the above mixtures have the characteristics and are believed to be salts of sulpho-stearic acid and they are both very effective in dehydrating wet oils.

It has been found that the ammonium licorice sulpho-stearic acid mixture is a more effective dehydrating agent for wet oil than is the ammonium salt of the sulpho-stearic acid. Likewise, it has been found that the ammonium salt of sulpho-stearic acid is markedly superior as an emulsion breaking agent to any salts which can be prepared by neutralizing sulpho-stearic acid with potassium or sodium hydroxide or with the hydroxides of any of the alkaline earth metals.

In the accompanying drawing is diagrammatically illustrated an apparatus in which the preferred method of dehydrating crude petroleum oil may be carried out. In the apparatus illustrated petroleum oil containing an oil-in-water emulsion is introduced through a pipe 10 and passes into a distributing tube 12 where it is mixed with a predetermined quantity of the reagent, preferably ammonium licorice sulpho-stearic acid solution, introduced from the tank 14. The dehydrating agent and the oil containing an emulsion are thoroughly mixed in passing down the distributor 12 and the mixture is passed out into the bottom of a gun barrel tank 16 directly over a steam heating coil 18. The treating agent and the heat both play active parts in breaking down the emulsion, causing the water or brine of the emulsion to settle at the bottom of the gun barrel tank and the oil containing unbroken emulsion to rise to the top of the tank 16 and overflow through a pipe 19 into a distributor 20 by which it is introduced into a settling tank 22. The brine settling to the bottom of the gun barrel tank 16 is continuously withdrawn through an automatic syphon 23.

The heated oil is thoroughly mixed with the ammonium sulpho-stearic acid or other treating agent used by the time it is passed through the distributor 20 so that practically all of the emulsion is broken by the time the oil reaches the bottom of the tank 22. The velocity of flow of oil through tank 22 is carefully controlled to permit the water deposited from the emulsion to settle to the bottom of the tank while the clear oil overflows at the top of the tank through a pipe 24 and is conducted into a stock or storage tank 26. The water deposited from the oil in the tank 22 may be intermittently or continuously withdrawn through a draw-off 28.

With the apparatus arrangement described above it will be seen that oil may be continuously pumped through it and be continuously dehydrated. Although it is preferred to use such a continuous method it is not necessary that the apparatus as shown in the drawing be used to obtain an effective dehydration of the oil, but any suitable apparatus may be used by which the ammonium licorice sulpho-stearic acid or other treating agent may be thoroughly mixed with the oil, heated and allowed to stratify to separate the water or brine from the oil.

The quantity of reagent which must be used in breaking down oil-water emulsions depends entirely upon the character of the emulsion and upon the character of the oil. If the emulsion has been recently formed it will break down much more readily than an emulsion which has been standing in the air or at the bottom of a tank for a considerable period. Concentrated solutions of ammonium sulpho-stearic acid and of ammonium licorice sulpho-stearic acid will break the most stubborn emulsions when used in amounts of ½ to 1% by volume of the wet oil being treated. Many emulsions may be effectively broken when used from .1 to .5% by volume of the preferred reagent to wet oil being treated.

The action of the ammonium licorice sulpho-stearic acid and also of the ammonium salt of sulpho-stearic acid in breaking oil-water emulsions appears to be more of a physical chemical nature than a true chemical nature. Experiments have shown that the formation and stability of emulsions of the water-in-oil type are largely the result of the operation of surface tension phenomena. The asphaltic and resinous matter present in those petroleum oils giving the greatest trouble with BS emulsion formation materially lowers the surface tension of the oil. This lowering of the surface tension of the oil results in concentration of the asphaltic matter at the oil-water interface. The concentration of the solute at the interface increases in accordance with the capacity of that solute for lowering surface tension. Since the emulsifying agent, asphalt, is strongly adsorbed at the oil-water interface due to its powerful lowering effect on the surface tension of the oil, the interface tends to curve so as to be concave on the water side. This results in a water-in-oil emulsion when the water is broken into small drops by mechanical agitation.

Surface tension is high in substances such as water whose molecules possess strong polarity. The molecules of oleic acid and of the fatty acids in general also possess a high degree of polarity and this is generally true of any organic anion of high molecular weight. The addition of a solute whose molecules possess a high degree of polarity to a solvent such as water whose molecules also possess strong polarity has the effect of rapidly lowering the surface tension of the solvent. It is believed that the possession of a rapid initial drop effect on surface tension is an important property of any treating agent employed for the resolution of emulsions containing liquids possessing strong polarity as the disperse phase.

Ammonia has a lowering effect on the surface tension of water. Caustic soda or caustic potash, on the other hand, when added to water, raise its surface tension. A slight excess of ammonia is therefore an advantage in making an emulsifying agent of the hydrophile colloid type while a slight excess of caustic soda is definitely harmful to the emulsion splitting properties of a reagent intended for use in breaking emulsions of the water-in-oil type. Ammonia water alone is a very mildly effective treating agent for breaking water-in-oil emulsions, and it is not effective in breaking a refractory emulsion. Ammoniacal licorice extract alone is a fairly effective treating agent and appears to be much more effective than ammonia water. In other words, ammoniacal licorice extract is a fairly good emulsifying agent of the hydrophile colloid type tending to form emulsions of the oil-in-water type. The licorice is strongly adsorbed at the oil-water interface and since it is much more easily wet by the water than by the oil and since the surface tension is lowered by the adsorption more on the water side than on the oil side, the surface on the water side is convex and the emulsion formed is of the oil-in-water type. Sulpho-stearic acid and in general, all modified fatty acids and modified organic compounds of high molecular weight, especially those provided with a strong negative group, e. g., the $HSO_3$ group in sulpho-stearic acid, for instance, are good emulsifying agents of the hydrophile colloid type, resembling in that respect the ammonium licorice extract. In general these modified organic compounds particularly those of high molecular weight and those possessing a high degree of unsaturation, are more effective alone with respect to surface tension lowering and emulsion-breaking properties than is ammonia licorice extract alone. However, experiments have clearly demonstrated that a mixture of the ammonium licorice extract with the sulpho-stearic acid or with any one of a number of other modified organic compounds having a lowering effect on the surface tension of water, is in every case more effective in breaking emulsions of the water-in-oil type than either of the reagents employed in the mixture when used alone. Thus it has been shown that ammonium licorice extract admixed with sulpho-stearic acid or with an ammonium salt of sulpho-stearic acid provides a reagent which is much more effective in breaking water-in-oil emulsions than the ammonium salt of the sulpho-stearic acid alone. In other words, when the ammonium licorice extract is admixed with another hydrophile colloid such as a sulpho-fatty acid, both the licorice and the ammonia have surface tension lowering effects on the solute of the water-in-oil emulsion over and above that of the sulpho-fatty acid, for otherwise the mixture would have been no more effective than the sulpho-fatty acid alone. The licorice and ammonia present in the ammonium licorice sulpho-stearic acid reagent constituting the preferred reagent of the present invention, in other words, not only retain their individual effectiveness in changing the surface tension at the oil-water interface, but in fact add to the power of the sulpho-stearic acid in lowering the surface tension on the water side. While the true chemical nature of licorice is not definitely known because it contains so many different kinds of substances, its action and also that of the ammonia in the preferred reagent of the present invention in effecting the resolution of the water and oil emulsions is believed to have been clearly demonstrated to be additive.

The addition to even the most resistant water-in-oil emulsion of a reagent comprising an admixture of two fairly effective emulsifying agents of the hydrophile colloid type (i. e. tending to make oil-in-water emulsions) in such amounts as to exceed the emulsifying tendency of the asphaltic and resinous bodies in the oil toward the formation of the water-in-oil type of emulsion will, by adsorption at the dineric interface, tend to curve the interface so as to be convex at the water side to produce the oil-in-water type of emulsion. When these two tendencies are of equal strength or nearly so the interface will be torn in opposite directions with equal force upon agitation, with the result that the original water-in-oil emulsion will break down and there will be no further tendency to form an emulsion of either form. In general only very small quantities of the reagent need be added and accordingly the cost of the treatment is correspondingly low.

While in the foregoing discussion the preferred reagent to be employed in accordance with the present invention has been described as the reaction product of concentrated surfuric acid, oleic acid and ammonium licorice extract, it has been found that effective reagents can be prepared from other mineral acids, other organic compounds of high molecular weight and other compounds having a lowering effect on the surface tension of the water. Accordingly, therefore, the invention in its broadest form includes the use of any reagent which can be prepared by admixing two or more compounds of the hydrophile colloid type in such proportions as to impart to the product an additive surface tension lowering effect on the solute of the emulsion which it is desired to break, in accordance with the additive surface tension lowering principle underlying the present invention. In general it has been found that the most effective reagents are those prepared by admixing two or more compounds of the hydrophile colloid type in substantially equal or molecular proportions, the proportions being so chosen that the reagent will have a maximum surface tension lowering effect on the material forming the dispersed phase of the emulsion.

The term "modified organic compound of high molecular weight" has been used in the specification and in the claims as a generic term to define the acidic addition or substitution products formed when an organic compound of high molecular weight, as for example, oleic acid, is reacted at suitable temperatures with a sulfuric acid or other material furnishing a strongly polar negative group, or the esters or neutral salts of such products.

In the claims emulsions are referred to as comprising oil and water. By the term "water" is is intended to include various brine or salt solutions which are associated with the oils in petroleum strata of the earth. Also in referring to the ammonium licorice sulpho-stearic acid and to the ammonium salts of sulpho-fatty acids in general, it is not to be understood that these are chemically pure compounds or, in fact, true chemical salts. The exact nature and chemical constitution of these mixtures is not definitely known.

Although the method of dehydrating emulsions and the reagents prepared in accordance with the additive surface tension lowering principle for use in dehydrating emulsions have been referred to as particularly adapted for dehydrating petroleum oil emulsion of the water-in-oil type, the methods, reagents and principles of the present invention are not limited to such a use and may be effectively applied in the treatment of emulsions of other types in which water is not the dispersed phase.

The preferred form of the invention having been thus described, what is claimed as new is:

1. A method of breaking an emulsion of oil and water comprising mixing an alkali metal salt of a sulpho-fatty-acid containing licorice with the emulsion.

2. A method of breaking an emulsion of oil and water comprising mixing a licorice compound of a sulpho-fatty-acid with the emulsion.

3. A method of breaking an emulsion of oil and water comprising mixing an ammonium licorice compound of sulpho-stearic-acid with the emulsion.

4. A method of breaking an emulsion of oil and water comprising mixing an ammonium licorice compound of a sulpho-fatty-acid with the emulsion, raising the temperature of the mixture to a point of from 90 to 140° F., permitting the heated mixture to stratify and separating water therefrom.

5. A method of treating oil containing an emulsion of oil and water comprising mixing the oil and emulsion with a sulpho-fatty acid compound containing licorice.

6. A method of treating petroleum oil containing an emulsion of oil and water comprising mixing ammonium licorice sulpho-stearic-acid with the oil and emulsion in the proportion of one-tenth to one per cent by volume of the wet oil being treated, stratifying the oil and separating water therefrom.

7. A method of breaking an emulsion of oil and water which comprises mixing with the emulsion an ammonium sulpho-compound, comprising the reaction product of ammonia and a sulfuric acid derivative of a fatty acid.

8. A method of breaking an emulsion of oil and water which comprises mixing with the emulsion a sulpho-compound comprising a mixture of sulphonated oleic acid and an alkaline solution of licorice.

9. A process of breaking a petroleum emulsion, characterized by subjecting the emulsion to the action of a demulsifying agent comprising an ammonium salt of sulpho stearic acid.

10. A process for breaking water-in-oil emulsions characterized by adding to such an emulsion a mixture composed of a suitable non-saponaceous demulsifying agent capable of lowering the surface tension of water and a substance that is capable of forming an oil-in-brine emulsion.

11. A process for breaking water-in-oil emulsions characterized by adding to such emulsion a reagent composed of a suitable non-saponaceous demulsifying agent of the hydrophile colloid type and a detergent hydrophile colloid substance that is capable of forming an oil-in-brine emulsion.

12. A method of breaking an emulsion of the water-in-oil type which comprises mixing with the emulsion a reagent comprising a sulpho fatty acid component and an alkaline reacting non-saponaceous component having hydrophile colloid properties, said reagent having a greater lowering effect on the surface tension of water than either of said hydrophile colloid components.

In testimony whereof I affix my signature.
JOHN C. WALKER.